United States Patent
Lloyd et al.

(10) Patent No.: US 7,408,319 B2
(45) Date of Patent: Aug. 5, 2008

(54) SYSTEM AND METHOD FOR REGENERATIVE ENERGY CONTROL WHEN MULTIPLE MOTORS SHARE A COMMON POWER SUPPLY

(75) Inventors: Sonny L. Lloyd, Cambridge (CA); Dikran Yaldizciyan, Mississauga (CA); Nicolae A. Morcov, Mississauga (CA); Randy James Fuller, Hillsburgh (CA)

(73) Assignee: Honeywell International Inc., Morristown, NJ (US)

( * ) Notice: Subject to any disclaimer, the term of this patent is extended or adjusted under 35 U.S.C. 154(b) by 115 days.

(21) Appl. No.: 11/430,977

(22) Filed: May 10, 2006

(65) Prior Publication Data
US 2007/0262735 A1    Nov. 15, 2007

(51) Int. Cl.
*H02P 1/24* (2006.01)

(52) U.S. Cl. .................. 318/729; 318/802; 318/376; 318/459

(58) Field of Classification Search ............ 318/87, 318/729, 802, 376, 459, 34, 46, 66; 388/928.1; 307/64, 66
See application file for complete search history.

(56) References Cited

U.S. PATENT DOCUMENTS

| | | | |
|---|---|---|---|
| 4,489,243 A * | 12/1984 | Nola | ........... 307/64 |
| 5,150,020 A | 9/1992 | Ueda et al. | |
| 5,751,150 A | 5/1998 | Rippel et al. | |
| 2005/0179264 A1 | 8/2005 | Ganev | |
| 2005/0224296 A1 | 10/2005 | Smith et al. | |
| 2005/0258795 A1 | 11/2005 | Choi | |
| 2005/0263329 A1 | 12/2005 | Kuras et al. | |
| 2005/0263331 A1 | 12/2005 | Sopko et al. | |

* cited by examiner

*Primary Examiner*—Karen Masih
(74) *Attorney, Agent, or Firm*—Oral Caglar, Esq.

(57) ABSTRACT

When multiple motors (40) share a common DC power supply (10) via a bus (20), a system and method is provided for managing the effect of regenerative energy caused by a motor. The regenerative energy may be sensed, e.g., by a power electronics controller (50, 50'). In response, one or more of the other motors currently in operation may be controlled to operate according to a reduced power factor. Thus, the excess energy is consumed without adding any new components or increasing the amount of work performed in the system.

20 Claims, 7 Drawing Sheets

SYSTEM AND METHOD FOR REGENERATIVE ENERGY CONTROL WHEN MULTIPLE MOTORS SHARE A COMMON POWER SUPPLY

STATEMENT REGARDING FEDERALLY SPONSORED RESEARCH OR DEVELOPMENT

This invention was made with Government funding under contract N00019-02-C-3002 awarded by Joint Strike Fighter (JSF) Program. The Government has certain rights in the invention.

FIELD OF THE INVENTION

The present invention relates to a system and method for controlling regenerative energy when multiple motors share a common DC power supply, and more particularly, for controlling the power factor of a motor to dissipate regenerative energy created by another motor. In this manner the system is capable of maintaining the balance of energy within safe operating parameters.

BACKGROUND OF THE INVENTION

A simplified configuration of a system in which multiple motors share a common DC power supply is illustrated in FIG. 1. As shown in this figure, each of the motors is connected to the DC power supply via a DC bus. FIG. 1 further shows that the DC bus includes a capacitive element, e.g., one or more capacitors connected across the DC output terminals of the power supply.

In such systems, deceleration of a motor causes energy stored in the motor and/or load to return to the DC bus power supply. This energy, which is referred to as "regenerative energy," is typically collected at the bus capacitor(s). In turn, the regenerative energy causes the voltage in the capacitors to increase, potentially to destructive levels.

An existing method for handling excess energy at the DC bus is to add a "slave axis," as illustrated in FIG. 2. In such a system, the slave axis is used for storing energy or performing useful work, as necessary, to maintain a balance of power at the DC bus. Thus, the slave axis performs additional work, either by contributing to the overall effort of the system or by storing energy, e.g., using a mechanical fly-wheel.

However, adding this slave axis to the system creates additional weight for the system. In many types of systems, any additional weight becomes problematic. For example, in the aerospace industry, it is important to keep system weight to a minimum.

Other existing methods for handling excess energy require the addition of electronic and/or mechanical components specifically for the task of energy dissipation. One example, which is commonly referred to as "dynamic braking," uses an additional power resistor and switch to dissipate energy. Although such methods may solve the problem of destructive voltage levels at the DC bus caused by regenerative energy, they impose additional costs on the system in the form of added components, increased weight, and other thermal concerns.

Thus, it would be advantageous to control the regenerative energy in the DC bus without adding any non-critical system components, such as a slave axis or dynamic braking components.

SUMMARY OF THE INVENTION

In the present invention, a system and method is provided for managing energy when multiple motors share a common DC power supply. According to an exemplary embodiment, when a motor transfers regenerative energy to the DC bus (e.g., by decelerating), another motor is controlled to consume this energy from the bus. This can be accomplished by controlling the other motor to operate according to an adjusted power factor.

In an exemplary embodiment, the system may include at least one power electronics controller that monitors the DC bus voltage. As the transference of regenerative energy to the DC bus causes the DC bus voltage to rise, this voltage change may be sensed by applying threshold detection to the monitored DC bus voltage.

For instance, the DC bus linking each of the motors to the DC power supply may have a capacitive element configured to store the regenerative energy as it is transferred toward the power supply. The voltage across this capacitive element may be measured, and by monitoring these measurements, a power electronics controller may sense the that the voltage is outside pre-determined threshold boundaries, for example, when the DC bus voltage rises due to regenerative energy caused by a particular motor. In response, the power electronics controller may decrease the power factor of another motor so that the other motor will consume or "waste away" the excess energy from the DC bus.

According to one exemplary embodiment of the invention, a power electronics controller may be provided for each of the motors in the system. When a controller senses an increase in DC bus voltage indicative of regenerative energy, and determines that its motor is not a source of the regenerative energy, that controller may change the operative power factor of the motor to consume the energy.

In another exemplary embodiment, the system may include a power electronics controller for a plurality of the motors sharing the power supply. In response to sensing regenerative energy on the bus, the controller may determine which of the motors is transferring the energy to the bus and control one or more of the other motors to consume the energy.

DETAILED DESCRIPTION OF EXEMPLARY EMBODIMENTS

Figure 1:
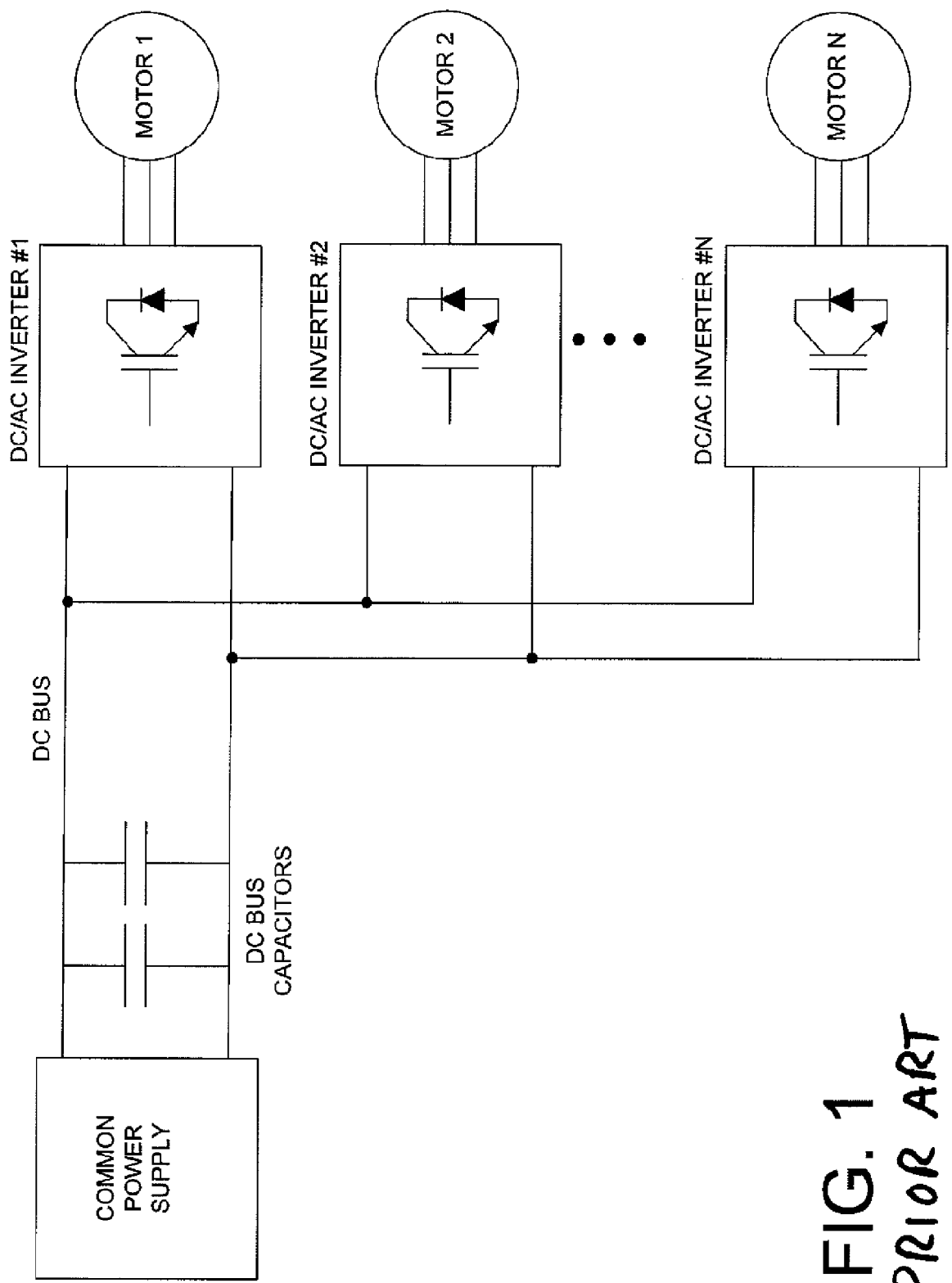
FIG. 1 is a block diagram illustrating the basic configuration of a system in which multiple motors share a common DC power supply.
Figure 2:
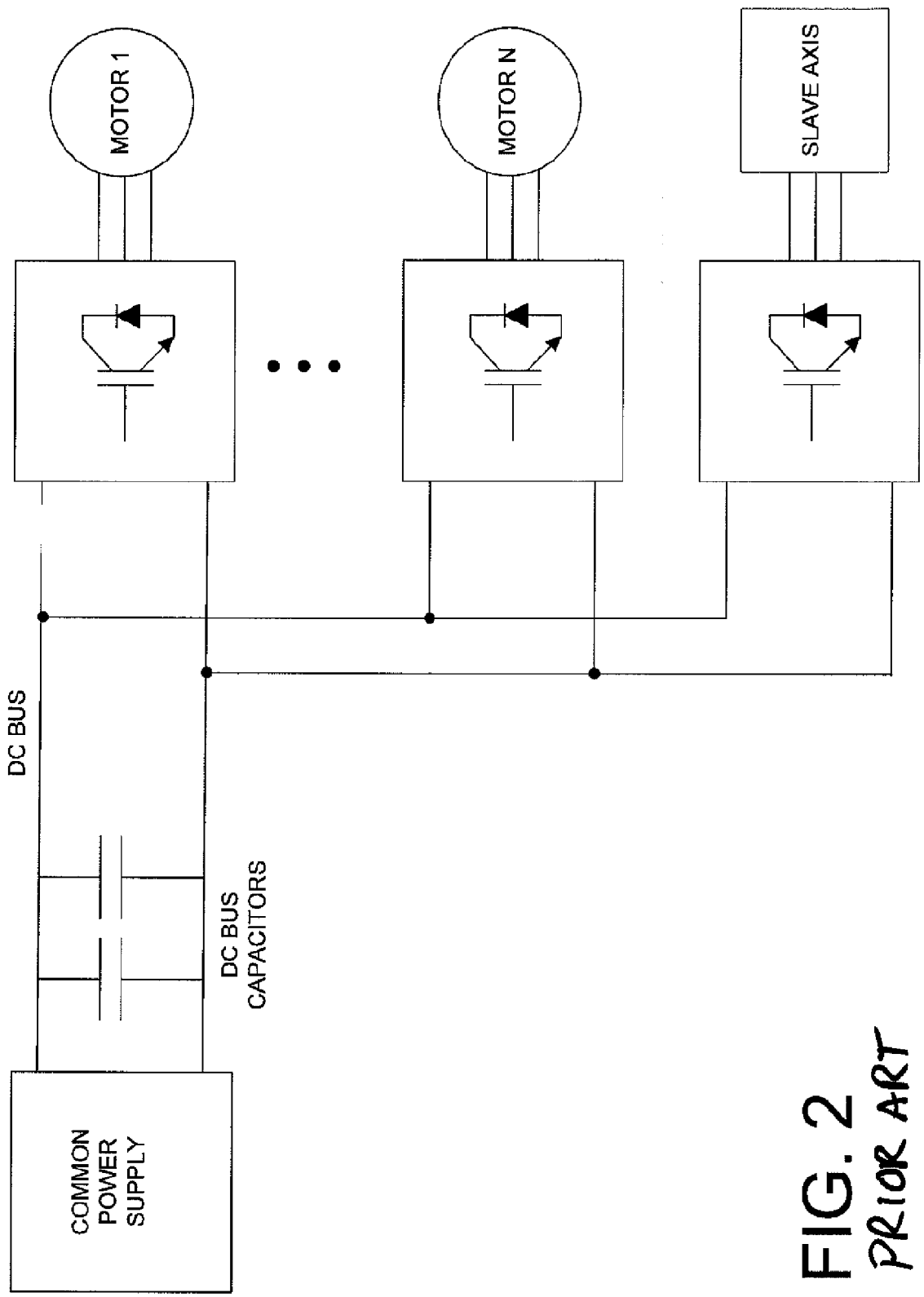
FIG. 2 is a block diagram illustrating an existing method for maintaining power balance at a DC bus through the use of a slave axis.

The present invention relates to a system in which multiple motors share a common DC power supply. FIG. 1 shows the basic configuration of such a system. As shown in FIG. 1, the power supply is connected to N motors (N≧2) via a DC power bus. The power supply may comprise any device configured to output DC power. Examples of the power supply include storage batteries, DC/DC converters, and AC/DC converters.

As shown in FIG. 1, the DC bus includes a capacitive element, such as one or more capacitors connected across the output terminals of the power supply. Furthermore, this figure shows that each of the N motors includes a DC/AC inverter. Each DC/AC inverter is responsible for receiving DC power from the bus and performing all necessary conversions to output a suitable AC signal to the motor. The DC/AC inverter operates under the control of a power electronics controller (not shown). By controlling the DC/AC inverter, the power electronics controller determines when the motor starts, accelerates, decelerates, or stops. Generally, the power electronics controller performs such control based on the work to be performed by the motor.

The present invention is directed to a system and method for controlling energy in such a system. Specifically, during operation of the system, each motor has the capacity of transferring regenerative energy back to the bus. For instance, as a motor decelerates, it causes stored system energy to be transferred back onto the bus toward the power supply. Changes to the motor's load may also cause the motor to transfer regenerative energy toward the power supply. The capacitive element of the bus collects and stores this excess energy (i.e., regenerative energy) and, as a result, the DC bus voltage increases. Exemplary embodiments of the invention prevent the voltage at the capacitive element from increasing to destructive levels by using another motor to dissipate the regenerative energy.

According to an exemplary embodiment, at least one power electronics controller may be utilized to sense the transfer of regenerative energy from a motor to the bus. In response, this controller causes another motor (which is not a source of the regenerative energy) to operate in such a manner as to consume, or waste away, the excess energy on the bus.

Figure 3:
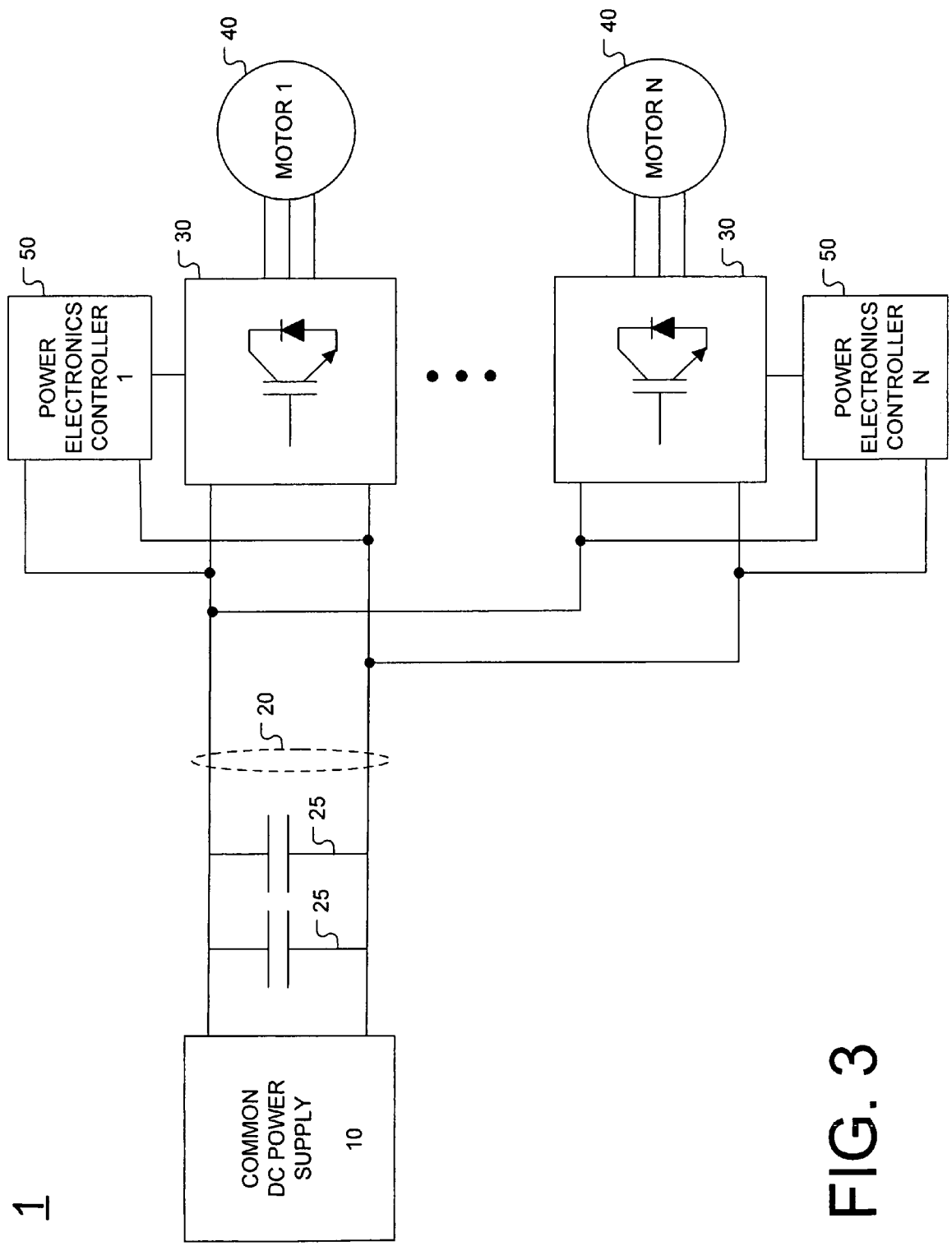
FIG. 3 is a block diagram illustrating an exemplary embodiment of the present invention, in which a plurality of power electronics controllers are provided for a plurality of motors in the system.

In an exemplary embodiment, the system may include multiple power electronics controllers for managing system energy as described above. FIG. 3 illustrates a system 1 including multiple power electronics controllers 50 for managing energy. As shown in this figure, the DC power supply 10 is connected to a DC bus 20. The bus 20 includes a capacitive element, which is shown as a pair of capacitors 25 in FIG. 3. However, it will be readily apparent to those of ordinary skill in the art that the capacitive element may comprise a different set of components, and/or a different overall configuration, than that illustrated in FIG. 3.

FIG. 3 further shows that the DC bus 20 is connected to a set of DC/AC inverters 30, each connected to a respective one of the N motors 40. Each inverter 30 converts the DC power supplied by the bus 20 to a suitable AC signal for driving the respective motor 40.

Also, FIG. 3 shows that the system 1 provides a power electronics controller 50 for each of the motors. Each power electronics controller 50 is also connected to the DC bus 20 in order to monitor the bus 20 for the presence of regenerative energy, typically indicated by an increase in DC bus voltage.

A more detailed description of the operation of the system in FIG. 3 is provided below.

Each power electronics controller 50 may be configured to control the operation of its corresponding motor 40 according to well-known methods. For instance, a given power electronics controller 50 may control the corresponding motor 40 to operate in accordance with the work requirements of the system 1. This may involve monitoring the status of the load to be actuated, and/or receiving instructions from another source (central computer, operator control panel, etc.).

However, each power electronics controller 50 is also configured to monitor the DC bus 20 in order to detect the transference of regenerative energy from any of the motors 40. Typically, this involves measuring the DC bus voltage and applying the measurements to a predetermined threshold, as will be described later in more detail.

If a power electronics controller 50 detects regenerative energy while its own motor 40 is in operation, the controller 50 can adjust that motor's 40 power factor so that the motor 40 consumes excess energy on the bus 20 without accelerating or performing additional work.

According to an exemplary embodiment, as shown in FIG. 3, each power electronics controller 50 may be connected to the bus 20 in such a manner that allows the controller 50 to measure the energy level of the bus 20. For instance, each power electronics controller 50 may be configured to measure the voltage level across bus capacitors 25. Alternatively, a power electronics controller 50 may receive such measurements from another device.

If the energy measurements (e.g., voltage measurements) indicate the existence of regenerative energy, the power electronics controller 50 determines whether its corresponding motor 40 is one of the sources. For instance, the controller 50 may check as to whether the motor 40 is currently decelerating or not. If the motor 40 is not decelerating, the controller 50 may assume that the motor 40 is not transferring energy back toward the power supply 10 (and, thus, is not causing the regenerative energy). However, a power electronics controller 50 may use other means for making this determination, as will be contemplated by those of ordinary skill in the art.

Assuming that a motor 40 is currently in operation, and is not a source of the regenerative energy, that motor 40 can help consume the regenerative energy if it operates according to a reduced power factor. Power factor refers to the ratio of real power (power actually used by the motor 40 to perform useful work (watts)) to apparent power (total electrical power (volt-amperes) supplied to the motor 40). Thus, the power factor is a measure of the motor's 40 efficiency. Thus, by decreasing the power factor of the motor 40, the motor 40 becomes less efficient and consumes more energy without increasing the work performed. This allows the motor 40 to consume more energy from the bus 20, while performing the same amount of work. Thus, the motor 40 can help eliminate the regenerative energy.

Various methods for increasing the power factor of a motor 40 will be described later, in more detail, in connection with FIG. 7.

In the exemplary embodiment of FIG. 3, it is possible to use multiple motors 40 to consume the regenerative energy created by another motor 40. For instance, each power electronics controller 50 in the system 1 may detect the regenerative energy and change the power factor of its corresponding motor 40. However, it is also possible to implement a scheme for limiting the number of motors 40 whose power factors are adjusted to consume the excess energy.

For instance, a higher-level controller (not shown) may determine which of the N motors 40 are potential candidates for consuming regenerative energy, and select a subset of these motors 40 to operate according to a reduced power factor. Alternatively, there may be a hierarchy established among the power electronic controllers 50 for determining which of the motors 40 are selected to consume the regenerative energy. Several factors may be considered for selecting which of the candidate motors 40 will operate according to reduced power factors, as will be described later, in further detail, in connection with FIG. 7.

A discussion of the configuration of the power electronics controller 50 will now be provided. There are several possible configurations for the power electronics controller 50. For example, the controller 50 may include a microprocessor that executes software instructions for performing control operations. Alternatively, the controller 50 may be comprised primarily of hardware, e.g., logic circuits and the like, designed to automatically output the appropriate control signals based on one or more inputs. It is also possible for the controller 50 to utilize existing configurations for such devices. It should be recognized that the present invention is not limited to any particular configuration, and that the power electronics controller 50 may utilize any combination of hardware, software, and firmware that will be readily contemplated by those of ordinary skill in the art.

As described above, the embodiment of FIG. 3 contemplates that each of the N motors 40 has a corresponding power electronic controller 50 capable of adjusting that motor's 40 power factor. However, according to an alternative embodiment, a single power electronics controller may be configured to control the power factor of a plurality of motors 40.

Figure 4:
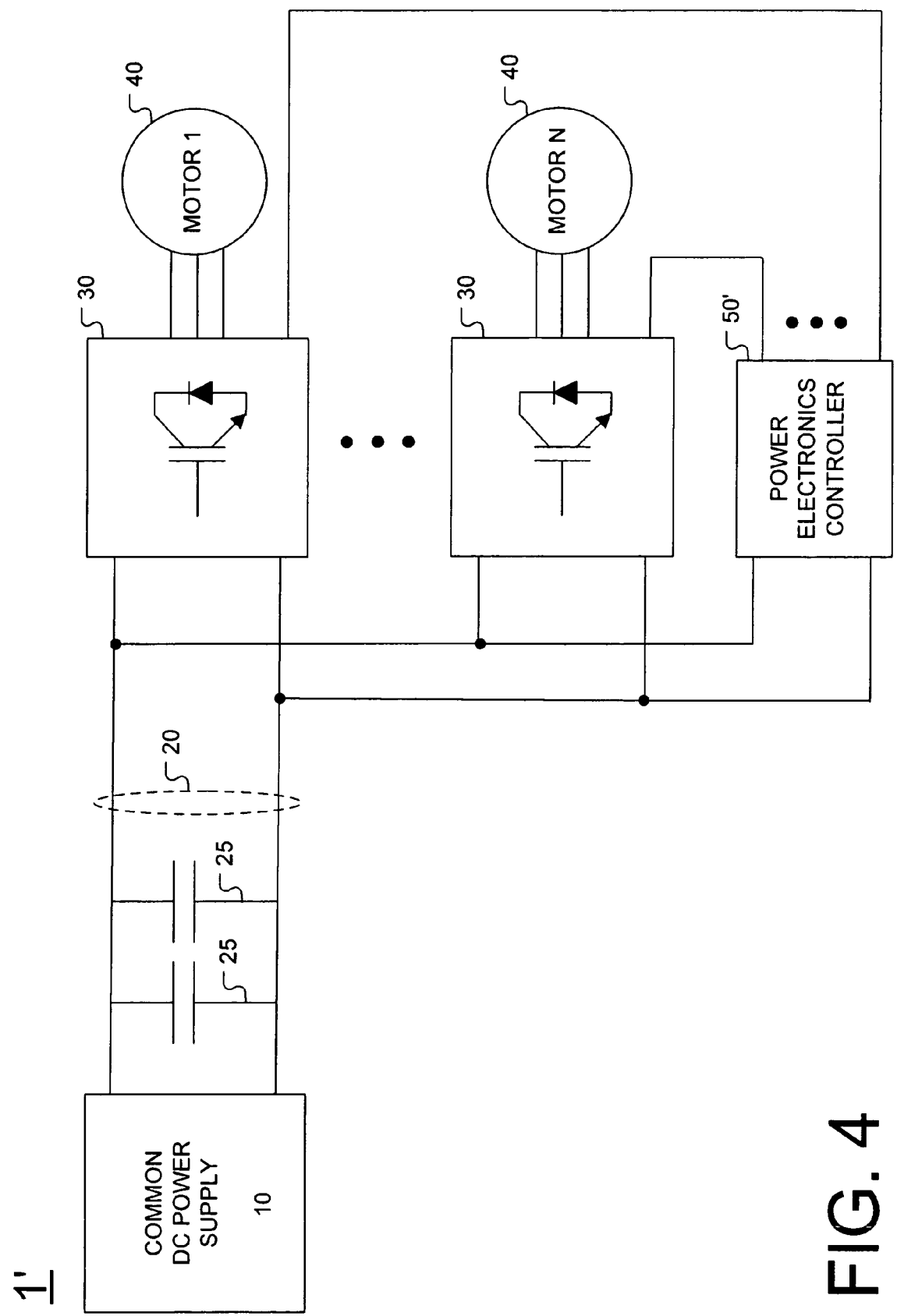
FIG. 4 is a block diagram illustrating an alternative exemplary embodiment of the present invention, in which a single power electronics controller is provided for a plurality of motors.

FIG. 4 illustrates an embodiment of the present invention, in which a single power controller is provided for managing regenerative energy. It should be noted that, in FIGS. 3 and 4, like reference numbers are used for referring to like elements. Thus, a detailed description of such elements need not be repeated here.

As described above, the main difference between the embodiments of FIG. 4 and FIG. 3 is that the system 1' includes a single power electronics controller 50' for controlling a plurality of motors 40. This power electronics controller 50' is configured to sense the presence of regenerative energy from the DC bus 20, similar to the power electronics controller 50 described above in relation to FIG. 3. For example, this sensing may be performed by monitoring the voltage level at the capacitor 25, or by other acceptable means as described above.

However, the power electronics controller 50' in FIG. 4 has the capability of controlling a plurality of motors 40. As shown in FIG. 4, the power electronics controller 50' has connections to the DC/AC inverter 30 of each of the N motors 40, which allow the power electronics controller 50' to control the operation of these motors 40.

According to an exemplary embodiment, if any of the N motors 40 are transferring regenerative energy to the bus 20, the power electronics controller 50' identifies a set of motors 40 in operation, which are not causing the regenerative energy (e.g., those motors 40 not currently decelerating). This identifies a set of candidate motors 40 for consuming the regenerative energy. The power electronics controller 50' may then select one or more of these candidate motors 40 to operate according to a reduced power factor in order to consume the excess energy from the bus 20. In making this selection, the power electronics controller 50' may utilize a scheme or algorithm taking into account several factors, as will be described in more detail below in connection with FIG. 7.

As discussed above, FIG. 3 shows a one-to-one correspondence between the power electronics controllers 50 and the N motors in system 1, and FIG. 4 shows a single power electronics controller 50' for controlling the N motors in system 1'. However, it will be readily apparent to those of ordinary skill in the art that other configurations are available. For example, it is contemplated that the N motors 40 sharing the common DC power supply 10 may be divided into subsets, where each subset of motors 40 are controlled by a separate power electronics controller according to principles of the present invention.

Figure 5:
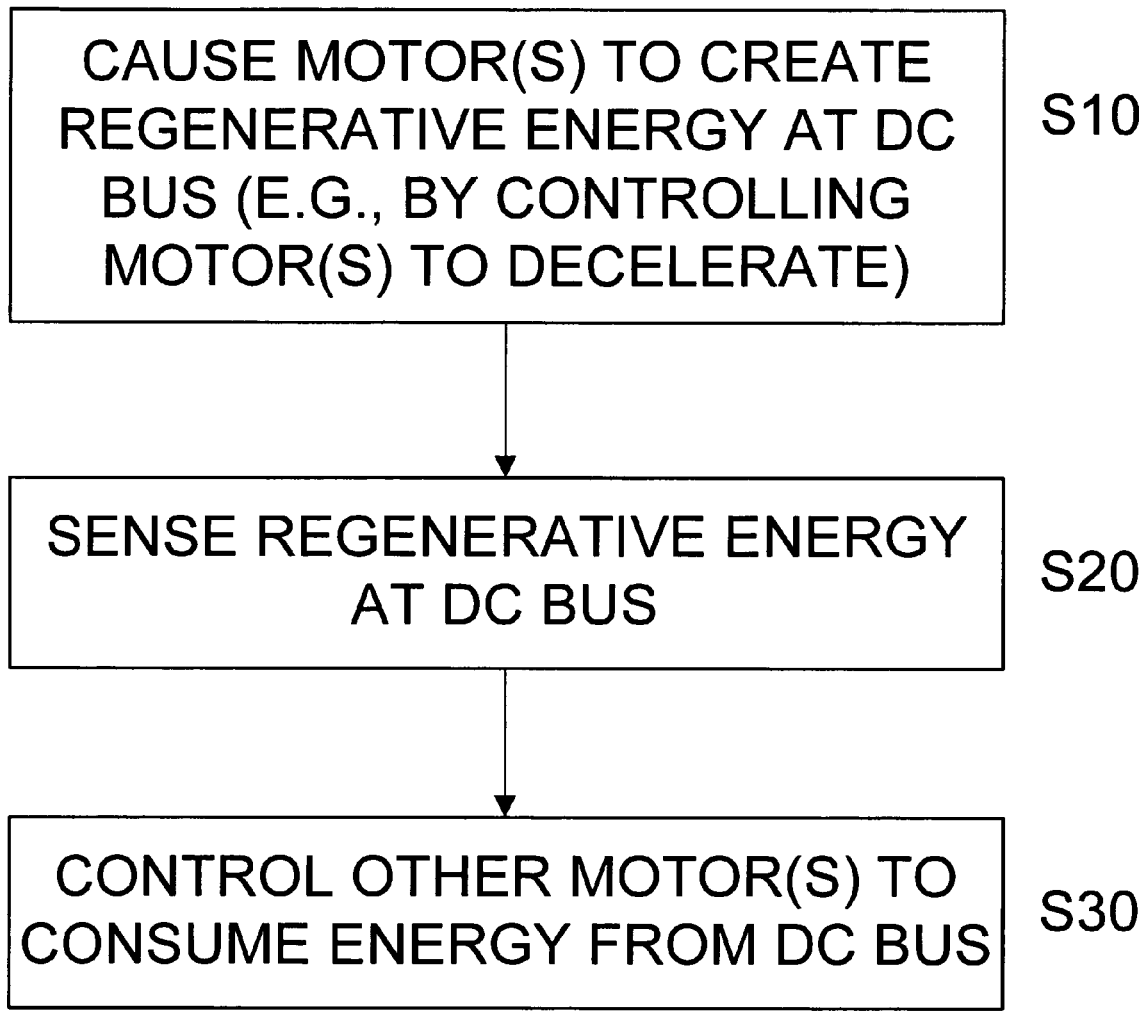
FIG. 5 is a flowchart illustrating a general process for managing energy at the DC bus, according to an exemplary embodiment of the present invention.
Figure 6:
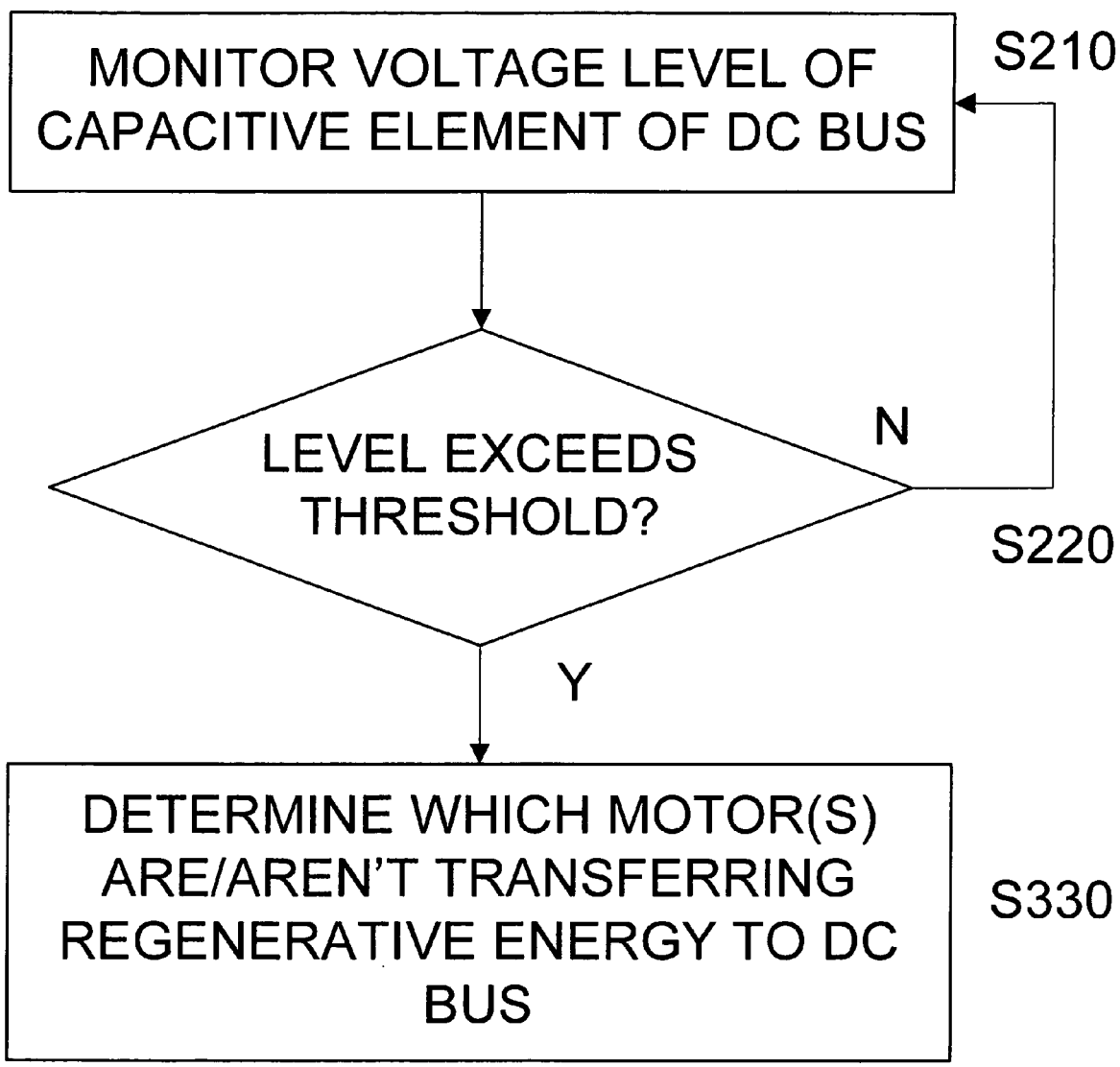
FIG. 6 is a flowchart illustrating a process for sensing regenerative energy on the DC bus, according to an exemplary embodiment of the present invention.
Figure 7:
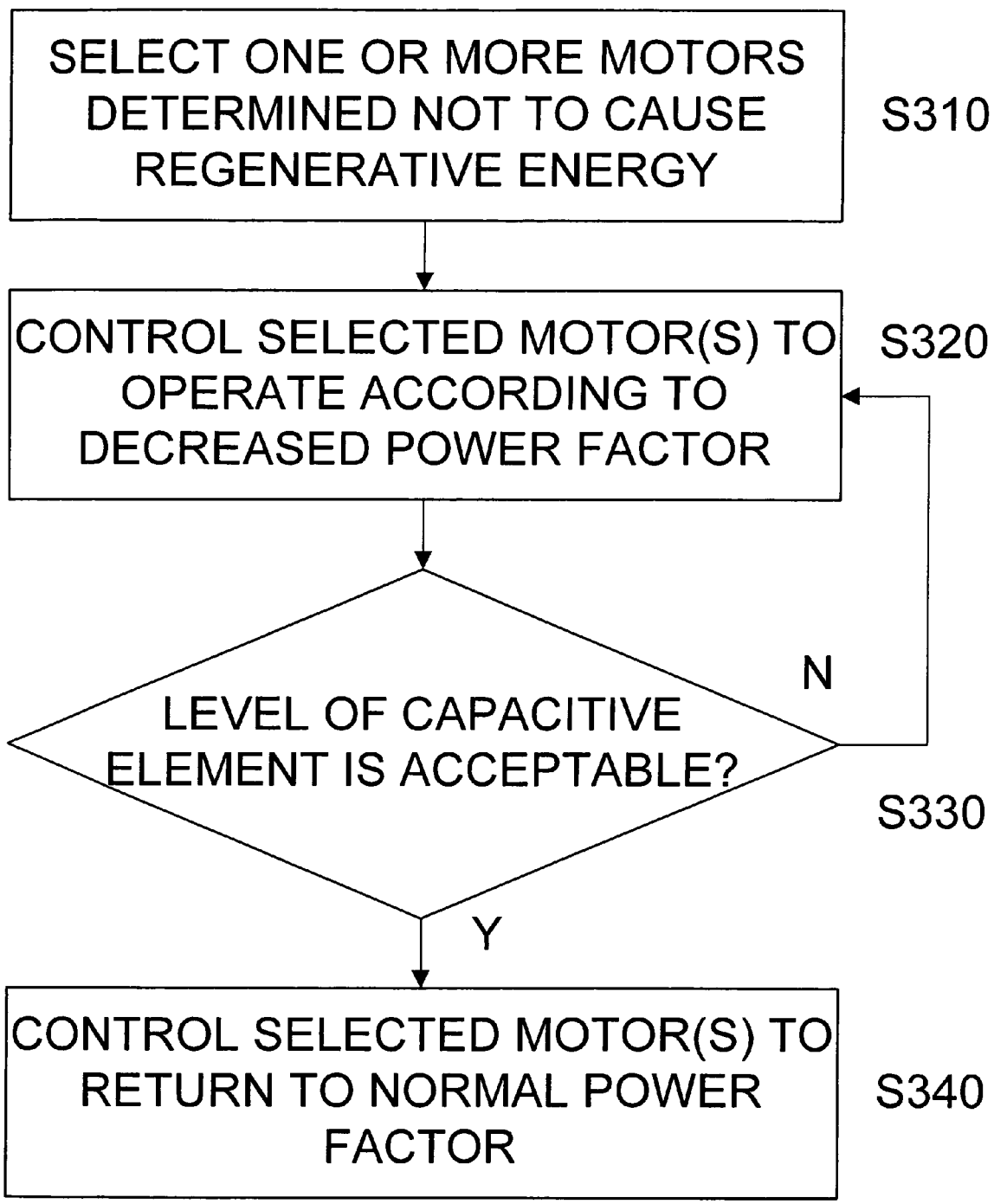
FIG. 7 is a flowchart illustrating a process for controlling a motor to consume energy from the DC bus, according to an exemplary embodiment of the present invention.

A more detailed description of an algorithm for managing energy according to the principles of the present invention will now be provided in connection with FIGS. 5-7. It should be recognized that the steps illustrated in these figures may be implemented using either a plurality of power electronics controllers 50 (consistent with the embodiment of FIG. 3), or a single power electronics controller 50' (consistent with the embodiment of FIG. 4). However, FIGS. 3 and 4 are merely illustrative of exemplary embodiments, and the present invention is not to be limited by the specific configurations shown therein.

As such, the process illustrated in FIGS. 5-7 is not to be constrained to the particular configurations described above in connection with FIGS. 3 and 4. Accordingly, there is no requirement that all of the process steps described in connection with FIGS. 5-7 be performed by the power electronics controllers 50, 50' described above. For example, it will be readily apparent that one or more of these process steps may be performed by higher-level controllers, such as a main computer, or other types of devices.

FIG. 5 is a flowchart providing a general overview of process for managing energy at the DC bus 20, according to an exemplary embodiment of the present invention. The step of S10 causes at least one of the motors 40 to create regenerative energy at the bus 20. Common examples are when a motor 40 is controlled to decelerate during normal operation, or when changes occur to the load of the motor 40 during operation.

The regenerative energy thus created is sensed according to S20. In response to the sensing of regenerative energy, at least one other motor 40 is controlled to operate in such a manner as to consume energy from the bus 20 in accordance with S30. Steps S20 and S30 will be described in further detail below in connection with FIGS. 6 and 7, respectively.

FIG. 6 is a flowchart illustrating a process for sensing regenerative energy on the DC bus (as shown in S20 of FIG. 5), according to an exemplary embodiment of the present invention. At S210, the voltage level of the capacitive element of the DC bus 20 is monitored. For instance, voltage measurements may be taken across one or more bus capacitors 25 that are connected across the DC output terminals of the power supply 10. Although step S210 describes the monitoring of voltage levels across the capacitive element, other types of electrical measurements may also be used for determining whether regenerative energy is being collected at a capacitive element, or other type of energy-storing component, of the DC bus 20.

According to S220, a determination is made as to whether the voltage level (or other electrical measure) exceeds a certain threshold, thus indicating that regenerative energy is being collected at the capacitive element. This threshold may merely represent the presence of regenerative energy. Alternatively, a higher threshold may be used, which indicates when the voltage level reaches a potentially destructive level. If the monitored level exceeds the threshold, S230 indicates that a determination is made as to which motor(s) 40 is (are) responsible for the regenerative energy (and, consequently, which motors 40 are not responsible). Of the motor(s) 40 determined not to be causing the regenerative energy, those that are presently performing useful work, i.e., actuating a given load, are determined to be potential candidates for consuming the regenerative energy.

It should be noted that steps S210-S230 of FIG. 6 merely illustrate one process for performing the sensing of regenerative energy in S210. However, there are other ways for determining that the DC bus 20 is collecting regenerative energy. For instance, if one or more motors 40 are currently decelerating, it can be assumed that stored system energy (i.e., regenerative energy) is being transferred back to the bus 20.

FIG. 7 illustrates a process for controlling a motor to consume energy from the DC bus (as shown in S30 of FIG. 5), according to an exemplary embodiment of the present invention. According to S310, a selection is made from among the candidate motors 40 that were determined in S230 (FIG. 6). In one exemplary embodiment, this selection may be performed according to various criteria, as will be explained below. However, in an alternative exemplary embodiment (previously described), all of the determined candidate motors 40 may be selected to share the task of consuming regenerative energy It is contemplated that one of the criteria to be considered in S310 includes heat sensitivity. This is because, in exemplary embodiments of the invention, the selected motors 40 consume the regenerative energy by operating according to reduced power factors. This basically causes the efficiency of the selected motors to decrease, thereby allowing more energy from the DC bus 20 to be "wasted" in the form of heat. Since the selected motors 40 will generate more heat, it might be beneficial to select motors 40 that are being used for less heat-sensitive applications of the system 1, 1'.

However, it is contemplated that other factors may be considered in S310 as well. Other factors might include the frequency at which a motor 40 is required to decelerate or stop during normal operation, the power factor at which the motor 40 normally operates, and/or present load conditions of the motor 40.

Referring again to FIG. 7, step S320 involves controlling the selected motor(s) 40 to operate according to a decreased power factor. As described above, the power factor is defined as the ratio of real power (resulting in actual work (watts)) to apparent power (total electrical power being supplied). As will be recognized by those of ordinary skill in the art, there are several methods for adjusting the power factor of a motor 40.

For example, consider the situation where the selected motors 40 are induction motors. Due to inductive effects in such motors, a phase lag may occur between the AC current and voltage waveforms, thereby increasing the amount of current needed to obtain a given amount of useful power. Thus, power factor is a function of the phase difference in voltage and current.

Capacitive loads may be used to offset the inductive effect of such motors and increase power factor. Thus, in order to decrease the power factor of an induction motor 40, one possible method is to actively decrease the capacitive load.

However, power factor can be decreased using another form of active power factor correction. Specifically, high frequency switching can be employed to control the electrical current in the load, similar to switched-mode power supplies. This type of switching can be used to adjust the current demand of an induction motor to increase phase-difference with respect to the AC voltage waveform.

However, the present invention covers other methods for decreasing the power factor of a selected motor 40 as will be contemplated by those of ordinary skill in the art.

Referring again to FIG. 7, the selected motor(s) 40 may continue to operate according to the adjusted power factor until a determination is made as to whether the energy level at the DC bus 20 is at an acceptable level. As shown in S330, this determination may dependent on the measured voltage level of the capacitive element of the DC bus 20. However, this determination can be made in other ways. For example, one possibility is to wait until the motor 40 causing the regenerative energy is no longer operating in such a manner as to transfer energy back toward the bus 20.

When it is determined that it is no longer necessary to consume excess energy from the DC bus 20, the power factor of the selected motor(s) 40 may be adjusted back to their normal operating levels, as shown in S340.

While exemplary embodiments have been described hereinabove, it should be noted that various modifications and variations may be made with respect thereto without departing from the spirit or scope of the present invention.

What is claimed is:

1. A system for managing energy, the system comprising:
   a DC power supply;
   a DC bus connecting the DC power supply as a common power supply to first and second motors, respectively, the DC bus including a capacitive element configured to store regenerative energy that is transferred from the second motor; and
   a first power electronics controller operably connected to the first motor, the first power electronics controller being configured to:
      sense the regenerative energy transferred from the second motor, and
      cause the first motor to operate according to a decreased power factor in order to consume the regenerative energy transferred from the second motor.

2. The system of claim 1, further comprising:
   a second power electronics controller operably connected to the second motor, the second power electronics controller being configured to:
      sense regenerative energy transferred from the first motor to the DC bus, and
      cause the second motor to operate according to a decreased power factor in order to consume the regenerative energy transferred from the first motor.

3. The system of claim 1, wherein the first power electronics controller is configured to change the first motor's power factor by operation of a microprocessor executing software commands.

4. The system of claim 3, wherein the microprocessor is configured to compare the sensed regenerative energy to a threshold, and cause the first motor's power factor to increase when the sensed regenerative energy exceeds the threshold.

5. The system of claim 1, wherein the first power electronics controller is configured to automatically increase the first motor's power factor in response to sensing the regenerative energy.

6. The system of claim 1, wherein the first power electronics controller causes the first motor to consume the regenerative energy without increasing the speed of the first motor.

7. The system of claim 6, wherein, while concurrently consuming regenerative energy from the DC bus, the first motor is further configured to perform useful work by actuating a given load in the system.

8. A system for managing energy supplied to a plurality of motors by a common DC power supply, the system comprising:
   a DC bus connecting the plurality of motors to the DC power supply, the DC bus including a capacitive element configured to store regenerative energy that is transferred from any of the motors as a result of deceleration;
   one or more power electronics controllers configured to control the plurality of motors, each power electronics controller being configured to:

sense regenerative energy transferred to the DC bus from at least one of the motors;

detect a motor that is not transferring the regenerative energy to the DC bus; and decrease the detected motor's power factor in order to cause the detected motor to consume stored energy from the DC bus without increasing the actual work of the detected motor.

9. The system of claim 8, wherein the one or more power electronics controllers causes the detected motor to consume the stored energy without increasing the speed of the detected motor.

10. The system of claim 8, wherein the system includes a single power electronics controller for controlling the plurality of motors, the single power electronics controller being configured to:

sense regenerative energy being transferred to the DC bus;

detect at least one motor not transferring regenerative energy to the DC bus; and cause the detected at least one motor to operate according to a decreased power factor in order to consume the stored energy from the DC bus.

11. The system of claim 10, wherein the system includes a plurality of power electronics controllers, each power electronics controller being configured to control a corresponding one of the plurality of motors, each power electronics controller being further configured to:

sense regenerative energy being transferred to the DC bus;

determine whether the corresponding motor is transferring the regenerative energy to the DC bus; and if the corresponding motor is not transferring the regenerative energy, controlling the corresponding motor to operate according to a decreased power factor in order to consume stored energy on the DC bus.

12. The system of claim 10, wherein, while concurrently consuming regenerative energy from the DC bus, each of the plurality of motors is configured to perform useful work by actuating a given load in the system.

13. The system of claim 10, wherein the capacitive element of the DC bus comprises one or more capacitors connected across the output terminals of the DC power supply.

14. A method for managing energy in a system in which a plurality of motors share a common DC power supply via a DC bus, the DC bus including a capacitive element for storing regenerative energy transferred from the motors, the method comprising:

sensing regenerative energy transferred to the bus from one of the plurality of motors sharing the common DC power supply;

responsive to the sensed regenerative energy, selecting at least one other motor from the plurality of motors that is not a source of regenerative energy transferred to the DC bus; and operating the at least one selected motor according to a decreased power factor in order to consume stored energy from the DC bus.

15. The method of claim 14, further comprising:

determining which of the plurality motors are not transferring regenerative energy to the DC bus, and selecting each of the determined to operate according to a decreased power factor.

16. The method of claim 14, further comprising:

comparing the sensed regenerative energy to a threshold, wherein the selecting step is performed in response to the sensed regenerative energy exceeding the threshold.

17. The method of claim 14, further comprising:

while concurrently consuming regenerative energy from the DC bus, utilizing each of the plurality of motors to perform useful work by actuating a given load in the system.

18. The method of claim 17, wherein a selected motor is operated according to a decreased power factor while the selected motor is performing the useful work.

19. The method of claim 14, wherein multiple motors are selected to operate according to a decreased power factor.

20. The method of claim 14, wherein the at least one selected motor is operated in such a manner as to decrease power factor without increasing the actual work of the selected motor.

* * * * *